US011315360B2

(12) United States Patent
Chang et al.

(10) Patent No.: US 11,315,360 B2
(45) Date of Patent: Apr. 26, 2022

(54) LIVE FACIAL RECOGNITION SYSTEM AND METHOD

(71) Applicant: Wistron Corporation, New Taipei (TW)

(72) Inventors: Yao-Tsung Chang, New Taipei (TW); Chuan-Yen Kao, New Taipei (TW); Chih-Yang Hung, New Taipei (TW)

(73) Assignee: Wistron Corporation, New Taipei (TW)

(*) Notice: Subject to any disclaimer, the term of this patent is extended or adjusted under 35 U.S.C. 154(b) by 37 days.

(21) Appl. No.: 16/777,514

(22) Filed: Jan. 30, 2020

(65) Prior Publication Data

US 2021/0174067 A1 Jun. 10, 2021

(30) Foreign Application Priority Data

Dec. 10, 2019 (TW) ................ 108145048

(51) Int. Cl.
*G06V 40/16* (2022.01)
*G06T 7/564* (2017.01)
*G06V 40/40* (2022.01)
*G06T 7/90* (2017.01)

(52) U.S. Cl.
CPC ............ *G06V 40/172* (2022.01); *G06T 7/564* (2017.01); *G06T 7/90* (2017.01); *G06V 40/162* (2022.01); *G06V 40/168* (2022.01); *G06V 40/45* (2022.01); *G06T 2207/10004* (2013.01)

(58) Field of Classification Search
CPC ........... G06K 9/00288; G06K 9/00906; G06K 9/00268; G06K 9/00234; G06T 7/90; G06T 7/564; G06T 7/10004
See application file for complete search history.

(56) References Cited

U.S. PATENT DOCUMENTS

| 10,635,894 B1* | 4/2020 | Genner | G06T 7/251 |
| 2014/0321752 A1* | 10/2014 | Zhang | H04N 5/00 382/190 |
| 2015/0138606 A1* | 5/2015 | Kakuta | G06K 15/1223 358/3.24 |
| 2016/0335483 A1* | 11/2016 | Pfursich | G06K 9/00899 |
| 2019/0026544 A1* | 1/2019 | Hua | A61B 5/1128 |
| 2020/0257914 A1* | 8/2020 | Wu | G06T 7/194 |
| 2020/0349731 A1* | 11/2020 | Ye | G06N 3/08 |

FOREIGN PATENT DOCUMENTS

| CN | 109376608 A | 2/2019 |
| CN | 110363087 A | 10/2019 |

* cited by examiner

*Primary Examiner* — Edward F Urban
*Assistant Examiner* — Wassim Mahrouka
(74) *Attorney, Agent, or Firm* — Donald E. Stout; Stout, Uxa & Buyan, LLP

(57) ABSTRACT

A live facial recognition method includes capturing a zoom-out image of a face of a subject under recognition; and detecting a frame outside the face of the subject under recognition on the zoom-out image. The subject under recognition is determined to be a living subject when the zoom-out image includes no frame outside the face.

17 Claims, 4 Drawing Sheets

LIVE FACIAL RECOGNITION SYSTEM AND METHOD

CROSS-REFERENCE TO RELATED APPLICATIONS

This application claims priority under 35 U.S.C. 119 to Taiwan Patent Application No. 108145048, filed on Dec. 10, 2019, the entire contents of which are herein expressly incorporated by reference.

BACKGROUND OF THE INVENTION

1. Field of the Invention

The present invention generally relates to facial recognition, and more particularly to a live facial recognition method and system.

2. Description of Related Art

Facial recognition is computer image processing capable of identifying facial features from a digital image or a video frame, and could be used as a security measure. Facial recognition is one of biometrics such as fingerprint or eye iris recognition. Facial recognition may be adapted to electronic devices such as computers, mobile phones and card readers. Particularly, as mobile devices are becoming more popular, the security measure is in high demand.

A conventional facial recognition system uses a two-dimensional (2D) camera to capture an image, from which facial features are extracted and compared with a database. However, the conventional facial recognition system usually cannot distinguish a real person from a picture while performing recognition, becoming a security loophole to be exploited.

In order to enhance reliability of the security measure, a facial recognition system is proposed to ask a user to act according to a given instruction such as swinging or rotating head, opening mouth or closing eyes. Further, some images may be captured while the user is acting on instruction, and accordingly depth information may be obtained and used to identify a real person. Nevertheless, those schemes take time and cause inconvenient.

A need has thus arisen to propose a novel facial recognition scheme capable of maintaining or enhancing reliability of the security measure, and accelerating facial recognition with convenience.

SUMMARY OF THE INVENTION

In view of the foregoing, it is an object of the embodiment of the present invention to provide a live facial recognition method and system capable of quickly recognizing a face accurately and conveniently.

According to one embodiment, a zoom-out image of a face of a subject under recognition is captured. A frame outside the face of the subject under recognition on the zoom-out image is detected. The subject under recognition is determined to be a living subject when the zoom-out image includes no frame.

DETAILED DESCRIPTION OF THE INVENTION

Figure 1A:
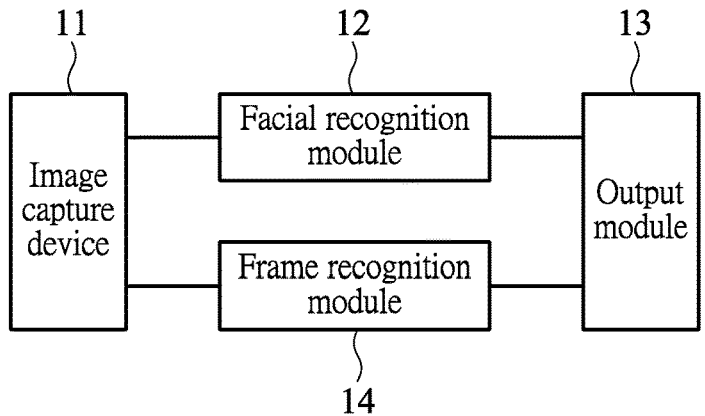
FIG. 1A shows a block diagram illustrating a live facial recognition system according to one embodiment of the present invention.
Figure 1B:
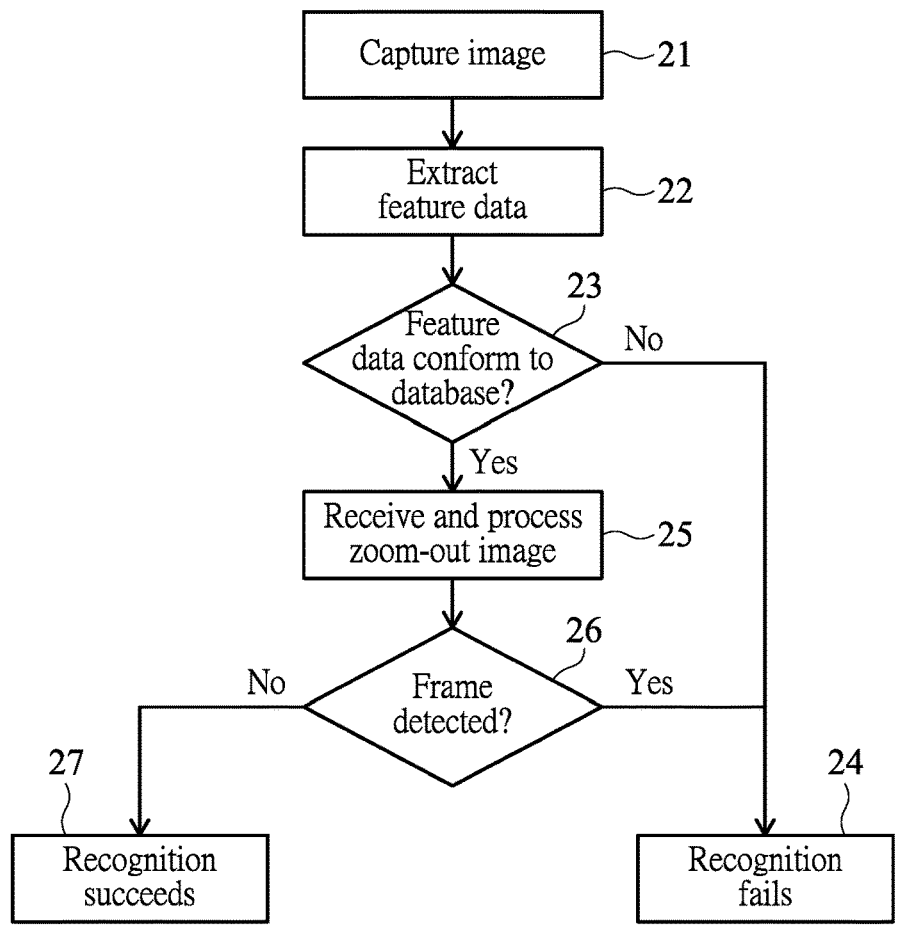
FIG. 1B shows a flow diagram illustrating a live facial recognition method according to one embodiment of the present invention.

FIG. 1A shows a block diagram illustrating a live facial recognition system 100 according to one embodiment of the present invention, and FIG. 1B shows a flow diagram illustrating a live facial recognition method 200 according to one embodiment of the present invention. The blocks of the live facial recognition system (system hereinafter) 100 and the steps of the live facial recognition method (method hereinafter) 200 may be implemented by hardware, software or their combination, for example, performed in a digital image processor.

In the embodiment, the system 100 may include an image capture device 11, such as a camera, configured to capture at least one image of a face of a subject under recognition (step 21) at a frame rate, for example, of 30 frames per second (FPS). The camera of the embodiment may be a two-dimensional (2D) camera or a three-dimensional (3D) camera (e.g., a 3D camera composed of two lenses or a 3D camera composed of a 2D camera and a depth detection device).

In the embodiment, the system 100 may include a facial recognition module 12 configured to extract at least one feature data (step 22) according to the image. In step 23, an output module 13 of the system 100 may compare the extracted feature data with a facial feature database (database hereinafter). If the extracted feature data does not conform to the database (i.e., difference therebetween is not less than a predetermined threshold, indicating that facial features therebetween are distinct), the output module 13 then determines that the recognition fails (step 24). If the extracted feature data conforms to the database, the flow of the method 200 then goes to step 25.

Figure 2A:
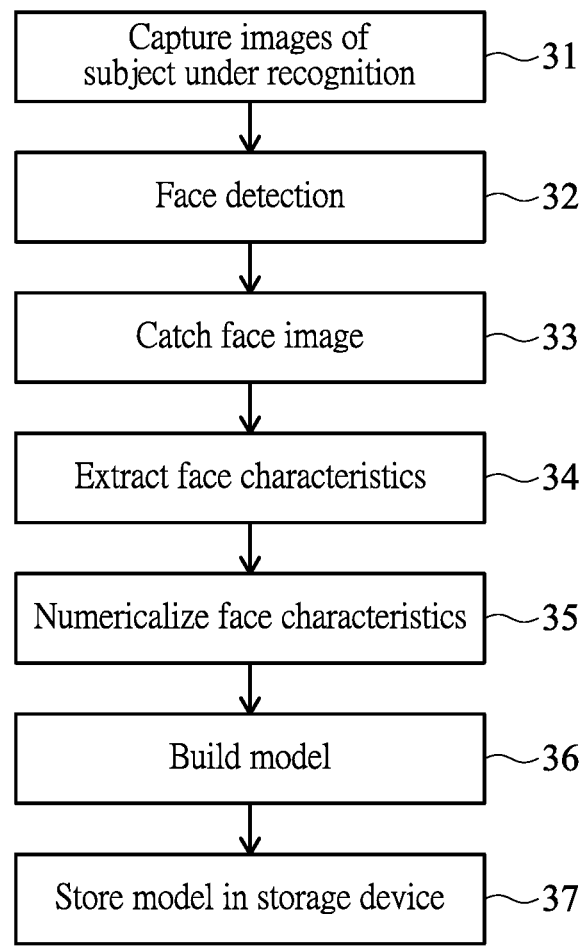
FIG. 2A shows a flow diagram illustrating a method of generating a database.
Figure 2B:
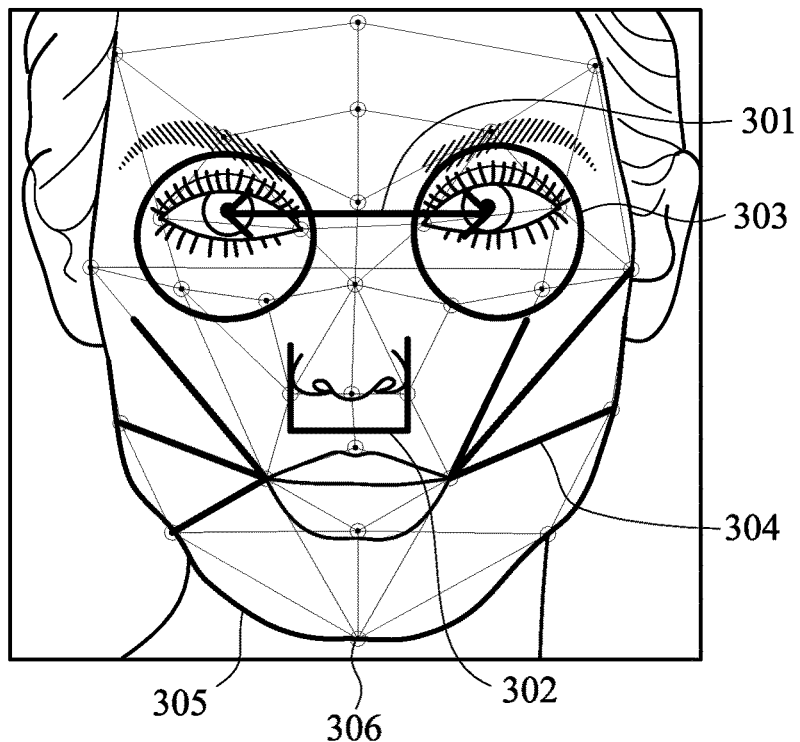
FIG. 2B shows exemplary face characteristics according to one embodiment of the present invention.

FIG. 2A shows a flow diagram illustrating a method 300 of generating a database. Specifically, in step 31, a camera may be used to capture an image of a subject under recognition. Next, in step 32, a processor may be used to perform face detection on the captured image. In step 33, a face image substantially covering a facial contour may be caught from the captured image according to results of the face detection. Subsequently, in step 34, the processor may extract or derive face characteristics from the face image. FIG. 2B shows exemplary face characteristics according to one embodiment of the present invention, including a distance 301 between eyes, a width 302 of a nose, depth 303 of an eye socket, a structure 304 of cheekbones, a length 305 of a jaw line and/or a chin point 306. In step 35, the processor may numericalize the face characteristics to generate facial feature values as feature data. Next, in step 36, a model is built according to the facial feature values, and a facial feature database is accordingly generated and stored in a storage device (step 37).

Figure 2C:
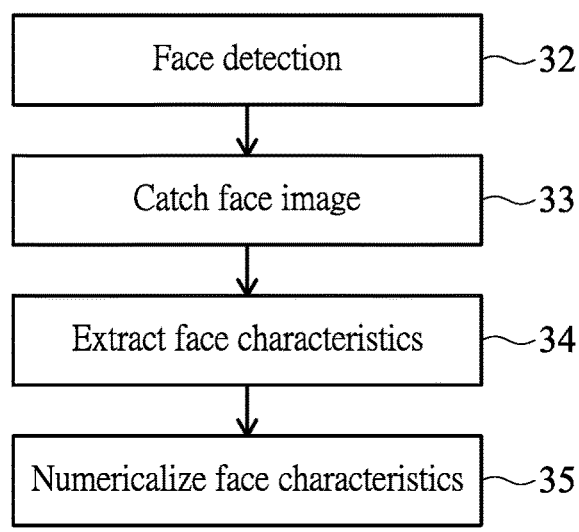
FIG. 2C shows a detailed flow diagram of step 22 in the method of FIG. 1B.

FIG. 2C shows a detailed flow diagram of step 22 in the method 200 of FIG. 1B. Extracting feature data of the face of the subject under recognition (step 22) is similar to steps 32-35 of FIG. 2A. Specifically, in step 32, the facial recognition module 12 may perform face detection on the captured image. In step 33, a face image substantially covering a facial contour may be caught from the captured image according to results of the face detection. Subsequently, in step 34, the facial recognition module 12 may extract or derive face characteristics from the face image. In step 35, the facial recognition module 12 may numericalize the face characteristics to generate facial feature values as feature data.

According to one aspect of the embodiment, the system 100 may include a frame recognition module 14 coupled to receive a zoom-out image captured by the image capture device 11, and configured to detect a frame outside the face of the subject under recognition on the zoom-out image by processing the zoom-out image (step 25). In one embodiment, the image capture device 11 may include one camera, and the zoom-out image is captured after adjusting a field of view (FOV) of the camera. In another embodiment, the image capture device 11 may include a first camera and a second camera, where the second camera has a field of view (FOV) larger than the first camera. The image captured by the first camera may be provided to the facial recognition module for extracting the feature data, while the zoom-out image captured by the second camera may be provided to the frame recognition module 14 for detecting the frame. Frame detecting may be performed by using ordinary edge detection technique. In step 26, if no frame is detected outside the face on the zoom-out image, the output module 13 may determine that the recognition succeeds (step 27). If a frame is detected outside the face on the zoom-out image, indicating that the subject captured by the image capture device 11 may be a photo or a display screen (i.e., non-living subject), the output module 13 may determine that the recognition fails (step 24).

Figure 3A:
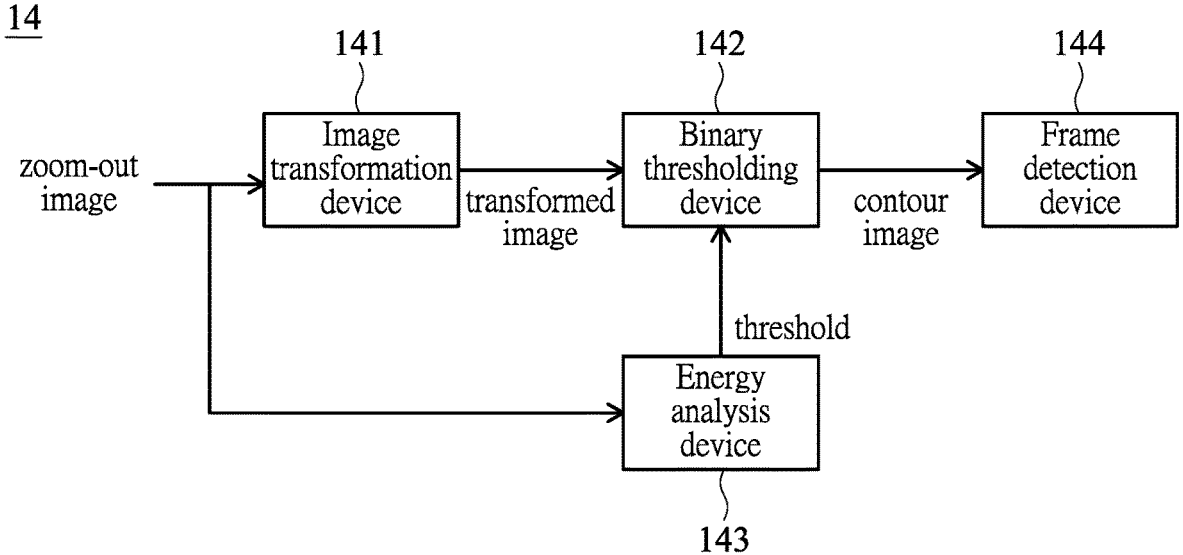
FIG. 3A shows a detailed block diagram of the frame recognition module of FIG. 1A.
Figure 3B:
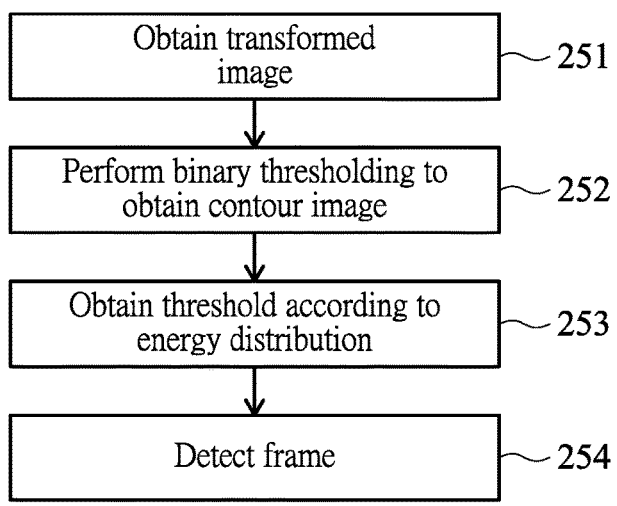
FIG. 3B shows a detailed flow diagram of step 25 of FIG. 1B.

FIG. 3A shows a detailed block diagram of the frame recognition module 14 of FIG. 1A, and FIG. 3B shows a detailed flow diagram of step 25 of FIG. 1B. In the embodiment, the frame recognition module 14 may include an image transformation device 141 configured to transform pixels of the zoom-out image to obtain a transformed image (step 251). In one embodiment, the image transformation device 141 may transform pixels of the zoom-out image from three primary colors (e.g., red (R), green (G) and blue (B)) to luminance Y with the following relationship:

$$Y=0.299R+0.587G+0.114B$$

In the embodiment, the frame recognition module 14 may include a binary thresholding device 142 configured to compare pixels of the transformed image with a predetermined threshold to obtain a contour image (step 252). Specifically, if a pixel value of the transformed image is greater than the threshold, a pixel value of a corresponding pixel of the contour image is set an assertive value (e.g., "1"); otherwise a pixel value of a corresponding pixel of the contour image is set a nonassertive value (e.g., "0"). The threshold for the binary thresholding device 142 may be obtained by analyzing energy distribution of the zoom-out image (step 253) by an energy analysis device 143. Therefore, the threshold may be dynamically obtained according to background and lighting of the image.

In another embodiment, the image transformation device 141 may calculate a sum of squares (or root mean square) of color difference (e.g., of red, green or blue) between neighboring pixels of the zoom-out image, thereby obtaining the contour image. In this embodiment, the frame recognition module 14 need not include the binary thresholding device 142 and the energy analysis device 143.

In the embodiment, the frame recognition module 14 may include a frame detection device 144 configured to detect a frame outside the face of the subject under recognition (step 254). In one embodiment, if a contour (detected on the contour image) outside the face is substantially closed and the contour is approximately a quadrilateral (e.g., square, rectangle or parallelogram), the contour is determined to be a frame, indicating that the subject captured by the image capture device 11 may be a photo or a display screen (i.e., non-living subject). In another embodiment, if a contour outside the face is not closed but includes at least two edges of a quadrilateral, and such at least two edges and boundaries of the contour image (or zoom-out image) may construct a closed quadrilateral, the contour is determined to be a frame, indicating that the subject captured by the image capture device 11 may be a photo or a display screen (i.e., non-living subject).

Although specific embodiments have been illustrated and described, it will be appreciated by those skilled in the art that various modifications may be made without departing from the scope of the present invention, which is intended to be limited solely by the appended claims.

What is claimed is:

1. A live facial recognition method, comprising:
   (a) capturing a first image of a face of a subject under recognition and capturing a zoom-out image of the face of the subject under recognition, the zoom-out image being captured by a camera with a field of view greater than the first image; and
   (b) detecting a frame outside the face of the subject under recognition on the zoom-out image;
   wherein the subject under recognition is determined to be a living subject when the zoom-out image includes no frame outside the face;
   wherein the step (b) comprises:
   obtaining a contour image according to the zoom-out image, the contour image including a first contour corresponding to the face of the subject under recognition and a second contour corresponding to an area outside the face; and
   detecting the frame outside the face of the subject under recognition according to the second contour of the contour image;
   wherein the contour image is obtained by comparing pixels of the zoom-out image with a predetermined threshold.

2. The method of claim 1, wherein the zoom-out image is captured after adjusting a field of view of an image capture device.

3. The method of claim 1, wherein the step (b) comprises:
   transforming pixels of the zoom-out image to obtain a transformed image; and
   comparing pixels of the transformed image with the predetermined threshold to obtain the contour image.

4. The method of claim 3, wherein the threshold is obtained by analyzing energy distribution of the zoom-out image.

5. The method of claim 1, wherein the step (b) comprises:
   calculating a sum of squares or root mean square of color difference between neighboring pixels of the zoom-out image to obtain the contour image.

6. The method of claim 1, wherein the frame comprises a closed quadrilateral.

7. The method of claim 1, wherein the frame comprises at least two edges of a quadrilateral, and the at least two edges and boundaries of the zoom-out image construct a closed quadrilateral.

8. The method of claim 1, before the step (a), further comprising:
capturing at least one image of the face of the subject under recognition;
extracting at least one feature data according to the at least one image; and
comparing the feature data with a facial feature database.

9. A live facial recognition system, comprising:
an image capture device comprising at least one camera and being configured to capture a first image of a face of a subject under recognition and capture a zoom-out image of the face of the subject under recognition, the zoom-out image being captured by a camera with a field of view greater than the first image;
at least one processor being coupled to the image capture device and comprising a frame recognition module and an output module to perform the following:
detecting a frame outside the face of the subject under recognition on the zoom-out image by obtaining a contour image according to the zoom-out image, the contour image including a first contour corresponding to the face of the subject under recognition and a second contour corresponding to an area outside the face, and detecting the frame outside the face of the subject under recognition according to the second contour of the contour image; and
determining the subject under recognition to be a living subject when the zoom-out image includes no frame outside the face;
wherein the contour image is obtained by comparing pixels of the zoom-out image with a predetermined threshold.

10. The system of claim 9, wherein the zoom-out image is captured after adjusting a field of view of the camera.

11. The system of claim 9, wherein the processor further comprises:
a facial recognition module configured to receive at least one image of the face of the subject under recognition, extract at least one feature data according to the at least one image, and compare the feature data with a facial feature database.

12. The system of claim 11, wherein the image capture device comprises a first camera and a second camera, the second camera having a field of view larger than the first camera, wherein the first camera captures the at least one image for the facial recognition module and the second camera captures the zoom-out image for the frame recognition module.

13. The system of claim 9, wherein the frame recognition module comprises:
an image transformation device configured to transform pixels of the zoom-out image to obtain a transformed image;
a binary thresholding device configured to compare pixels of the transformed image with the predetermined threshold to obtain the contour image; and
a frame detection device configured to detect the frame outside the face of the subject under recognition according to the contour image.

14. The system of claim 13, wherein the frame recognition module further comprises:
an energy analysis device that analyzes energy distribution of the zoom-out image to obtain the predetermined threshold.

15. The system of claim 9, wherein the frame recognition module comprises:
an image transformation device configured to calculate a sum of squares or root mean square of color difference between neighboring pixels of the zoom-out image to obtain the contour image; and
a frame detection device configured to detect the frame outside the face of the subject under recognition according to the contour image.

16. The system of claim 9, wherein the frame comprises a closed quadrilateral.

17. The system of claim 9, wherein the frame comprises at least two edges of a quadrilateral, and the at least two edges and boundaries of the zoom-out image construct a closed quadrilateral.

* * * * *